United States Patent
Funasaka et al.

(10) Patent No.: US 11,098,704 B2
(45) Date of Patent: Aug. 24, 2021

(54) STRUCTURE, DIAPHRAGM-TYPE COMPRESSOR, COOLER, PROJECTOR, AND METHOD FOR MANUFACTURING STRUCTURE

(71) Applicant: Seiko Epson Corporation, Tokyo (JP)

(72) Inventors: Tsukasa Funasaka, Shiojiri (JP); Yuki Hanamura, Azumino (JP)

(73) Assignee: Seiko Epson Corporation

( * ) Notice: Subject to any disclaimer, the term of this patent is extended or adjusted under 35 U.S.C. 154(b) by 119 days.

(21) Appl. No.: 16/541,616

(22) Filed: Aug. 15, 2019

(65) Prior Publication Data

US 2020/0056605 A1 Feb. 20, 2020

(30) Foreign Application Priority Data

Aug. 17, 2018 (JP) .............................. JP2018-153447

(51) Int. Cl.
*F04B 43/02* (2006.01)
*G03B 21/16* (2006.01)

(52) U.S. Cl.
CPC .............. *F04B 43/02* (2013.01); *G03B 21/16* (2013.01)

(58) Field of Classification Search
CPC ........ G03B 21/16; F04B 45/04; F04B 45/041; F04B 45/045; F04B 45/047; F04B 53/10; F04B 43/021; F04B 43/023; F04B 43/028; F04B 43/04; F04B 43/043; F04B 43/046; F04B 43/02; F16K 25/00; F16K 25/005; F16K 99/0055; F16K 99/0057; F16K 99/0015
See application file for complete search history.

(56) References Cited

U.S. PATENT DOCUMENTS

| | | | |
|---|---|---|---|
| 6,390,791 | B1 | 5/2002 | Maillefer et al. |
| 2004/0120836 | A1* | 6/2004 | Dai ....................... F04B 53/106 417/413.2 |
| 2008/0236191 | A1 | 10/2008 | Tsuchiya |
| 2011/0300009 | A1 | 12/2011 | Kikuchi et al. |
| 2017/0226994 | A1* | 8/2017 | Richter ................. H01L 41/098 |

FOREIGN PATENT DOCUMENTS

| | | |
|---|---|---|
| CN | 1271407 A | 10/2000 |
| CN | 1399070 A | 2/2003 |
| CN | 101275788 A | 10/2008 |
| CN | 102301138 A | 12/2011 |
| DE | 102012018029 A1 | 3/2014 |
| FR | 2554516 A1 | 5/1985 |
| JP | 2002-106468 A | 4/2002 |
| JP | 2005-009531 A | 1/2005 |
| JP | 2011-256741 A | 12/2011 |
| WO | 2010089865 A1 | 8/2010 |

* cited by examiner

*Primary Examiner* — Ryan D Howard
(74) *Attorney, Agent, or Firm* — Harness, Dickey & Pierce, P.L.C.

(57) ABSTRACT

A structure according to an embodiment includes a first substrate including a first valve and a second substrate joined to the first substrate. The structure includes a region where the first valve and the second substrate are not joined. A sticking suppressing section is provided in at least one of the first valve and the second substrate in the region. By configuring the structure in this way, it is possible to suppress sticking of the first valve to the second substrate in the structure including the first substrate including the first valve and the second substrate joined to the first substrate.

6 Claims, 12 Drawing Sheets

STRUCTURE, DIAPHRAGM-TYPE COMPRESSOR, COOLER, PROJECTOR, AND METHOD FOR MANUFACTURING STRUCTURE

The present application is based on, and claims priority from, JP Application Serial Number 2018-153447, filed Aug. 17, 2018, the disclosure of which is hereby incorporated by reference herein in its entirety.

BACKGROUND

1. Technical Field

The present disclosure relates to a structure including a valve, a diaphragm-type compressor, a cooler, a projector, and a method for manufacturing the structure.

2. Related Art

Structures including various valves have been used. Among such structures, there is a structure having a configuration for bringing a valve into contact with a region opposed to the valve to close a channel and separating the valve from the opposed region to open the channel.

For example, JP-A-2005-9531 (Patent Literature 1) discloses a check valve having a configuration for bringing a valve body into contact with a valve seat provided in a position opposed to the valve body to close, with the valve body, a channel provided in the valve seat and separating the valve body from the valve seat to open the channel.

However, in the structure in the past having the configuration for bringing the valve into contact with the opposed region to close the channel and separating the valve from the opposed region to open the channel as described in Patent Literature 1, in some case, the valve sticks to the opposed region and an opening and closing failure of the channel occurs.

SUMMARY

A structure according to an aspect of the present disclosure includes: a first substrate including a first valve; and a second substrate joined to the first substrate. The structure includes a region where the first valve and the second substrate are not joined. A sticking suppressing section is provided in at least one of the first valve and the second substrate in the region.

BRIEF DESCRIPTION OF THE DRAWINGS

FIG. 2 is a schematic diagram showing the diaphragm-type compressor according to the first embodiment of the present disclosure and is a perspective view of a state in which a frame is partially seen through.

DESCRIPTION OF EXEMPLARY EMBODIMENTS

Figure 1:
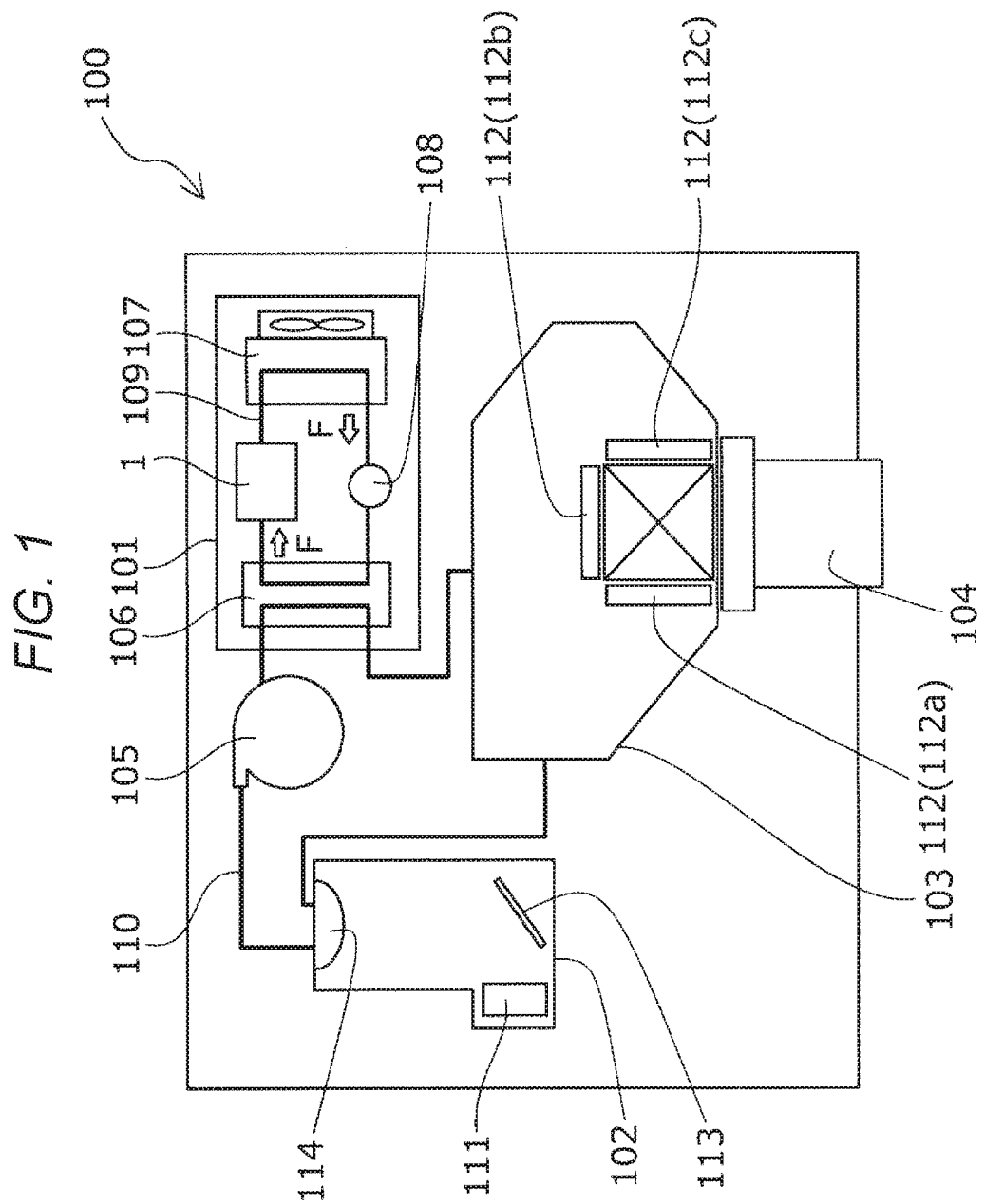
FIG. 1 is a schematic diagram showing an example of use of a diaphragm-type compressor according to a first embodiment of the present disclosure.

First, the present disclosure is schematically explained.

A structure according to a first aspect of the present disclosure includes: a first substrate including a first valve; and a second substrate joined to the first substrate. The structure includes a region where the first valve and the second substrate are not joined. A sticking suppressing section is provided in at least one of the first valve and the second substrate in the region.

According to this aspect, since the sticking suppressing section is provided in the region where the first valve and the second substrate are not joined, the first valve and the second substrate less easily stick to each other. Therefore, it is possible to suppress sticking of the first valve to the second substrate.

In a second aspect of the present disclosure, in the structure according to the first aspect, a material of the sticking suppressing section may be a material different from a material of the first valve.

According to this aspect, the material of the sticking suppressing section is the material different from the material of the first valve. Therefore, it is possible to more easily and effectively prevent the first valve from easily sticking to the second substrate than a configuration for machining the first valve to prevent the first valve from easily sticking to the second substrate.

In a third aspect of the present disclosure, in the structure according to the first or second aspect, a force developing section in which a force is applied to the first valve in a direction in which the first valve is pressed toward the second substrate may be provided in the region.

According to this aspect, the force developing section in which a force is applied to the first valve in the direction in which the first valve is pressed toward the second substrate is provided in the region opposed to the second substrate and not joined to the second substrate. Therefore, it is possible to suppress a leak of fluid from a channel in a state in which the channel is closed by the first valve.

In a fourth aspect of the present disclosure, in the structure according to the third aspect, the force developing section may be configured integrally with the sticking suppressing section.

According to this aspect, the force developing section is configured integrally with the sticking suppressing section. Therefore, the force developing section can be provided even when the first valve is small and it is difficult to configure the force developing section separately from the sticking suppressing section.

In a fifth aspect of the present disclosure, in the structure according to the third aspect, the force developing section may be configured separately from the sticking suppressing section.

According to this aspect, the force developing section is configured separately from the sticking suppressing section. Therefore, it is possible to easily improve performance of each of the sticking suppressing section and the force developing section.

A diaphragm-type compressor according to a sixth aspect of the present disclosure includes: a substrate, which is the structure according to any one of the first to fifth aspects; an actuator; and a diaphragm provided between the substrate and the actuator, the substrate, the actuator, and the diaphragm being laminated. In a direction of the lamination, the substrate includes a thick plate section and a thin plate section, and the diaphragm is joined to the thick plate section and separated from the thin plate section.

According to this aspect, it is possible to compress the fluid with the diaphragm-type compressor in which sticking of the first valve to the second substrate is suppressed.

A cooler according to a seventh aspect of the present disclosure includes: the diaphragm-type compressor according to the sixth aspect; a heat exchanging section configured to radiate heat of a coolant that rises in temperature by being compressed by the diaphragm-type compressor; and a coolant expanding section configured to expand the coolant.

According to this aspect, it is possible to cool an object to be cooled with the cooler in which sticking of the first valve to the second substrate is suppressed.

A projector according to an eighth aspect of the present disclosure includes the cooler according to the seventh aspect. A light source or an optical element is coupled to the cooler via a secondary coolant pipe.

According to this aspect, it is possible to project a video with the projector including the cooler including the diaphragm-type compressor in which sticking of the first valve to the second substrate is suppressed.

A method for manufacturing a structure according to a ninth aspect of the present disclosure is a method for manufacturing a structure including a first substrate including a first valve and a second substrate joined to the first substrate, the method including: a joining step of joining the first substrate and the second substrate to include a region where the first valve and the second substrate are not joined; and a sticking-suppressing-section forming step of providing a sticking suppressing section in at least one of the first valve and the second substrate in the region.

According to this aspect, since the sticking suppressing section is provided in the region where the first valve and the second substrate are not joined, the first valve and the second substrate less easily stick to each other. Therefore, it is possible to suppress sticking of the first valve to the second substrate.

Diaphragm-type compressors according to embodiments of the present disclosure are explained in detail below with reference to the accompanying drawings.

First Embodiment (FIGS. 1 to 6)

A diaphragm-type compressor 1 according to a first embodiment of the present disclosure is explained.

First, a projector 100, which is an example of an apparatus including the diaphragm-type compressor 1 according to the first embodiment of the present disclosure, is explained with reference to FIG. 1.

The projector 100 shown in FIG. 1 includes a light source unit 102 including a light source 114, a phosphor 111, and a dichroic mirror 113. The projector 100 includes an optical element unit 103 including an optical element 112 including an optical element 112a for red light, an optical element 112b for green light, and an optical element 112c for blue light and a projection lens 104. The projector 100 includes a cooler 101 for cooling the light source unit 102 and the optical element unit 103.

The cooler 101 includes the diaphragm-type compressor 1 according to this embodiment, details of which are explained below, a heat exchanging section 107, a coolant expanding section 108, and an evaporator 106. The cooler 101 is configured such that a primary coolant flows in a direction F in a primary coolant pipe 109. Since such a configuration is adopted, the cooler 101 can cool the light source unit 102 and the optical element unit 103, which are objects to be cooled, while suppressing sticking of a first valve to a second substrate explained below.

The primary coolant is compressed by the diaphragm-type compressor 1 and rises in temperature. The primary coolant flowing into the diaphragm-type compressor 1 is low-pressure gas. The primary coolant flowing out from the diaphragm-type compressor 1 is high-pressure gas.

The primary coolant compressed by the diaphragm-type compressor 1 is cooled to a predetermined temperature by the heat exchanging section 107. The primary coolant cooled by the heat exchanging section 107 is high-pressure liquid.

The primary coolant cooled by the heat exchanging section 107 is expanded by the coolant expanding section 108 and the temperature of the primary coolant drops. The primary coolant expanded by the coolant expanding section 108 is low-pressure liquid.

The evaporator 106 changes the primary coolant from liquid to gas on the inside of the evaporator 106 and absorbs heat on the inside of the evaporator 106. The light source unit 102, the optical element unit 103, and the cooler 101 are coupled by a secondary coolant pipe 110. A secondary coolant is circulated in the secondary coolant pipe 110 by a liquid feeding pump 105. The primary coolant pipe 109 and the secondary coolant pipe 110 are disposed side by side on the inside of the evaporator 106 of the cooler 101. Since the evaporator 106 has such an internal configuration, the secondary coolant is cooled on the inside of the evaporator 106, the temperature of which drops because the primary coolant is changed from liquid to gas. The cooled secondary coolant circulates in the light source unit 102 and the optical element unit 103, whereby the light source unit 102 and the optical element unit 103 are cooled.

As explained above, the diaphragm-type compressor 1 according to this embodiment can be suitably used in the projector 100. Since the projector 100 shown in FIG. 1 includes the diaphragm-type compressor 1 according to this embodiment explained in detail below, it is possible to project a video with a projector in which sticking of the first valve to the second substrate, which are constituent members of the diaphragm-type compressor 1, is suppressed.

However, a diaphragm-type compressor of the present disclosure and a structure including a valve, which is a constituent member of the diaphragm-type compressor, are not limited to the use in the projector and can be used in an apparatus or the like including a constituent member that generates heat such as a printer, a computer (a notebook personal computer, a desktop personal computer, etc.), and a robot.

The configuration of the diaphragm-type compressor 1 is explained in detail with reference to FIGS. 2 to 4.

Figure 2:
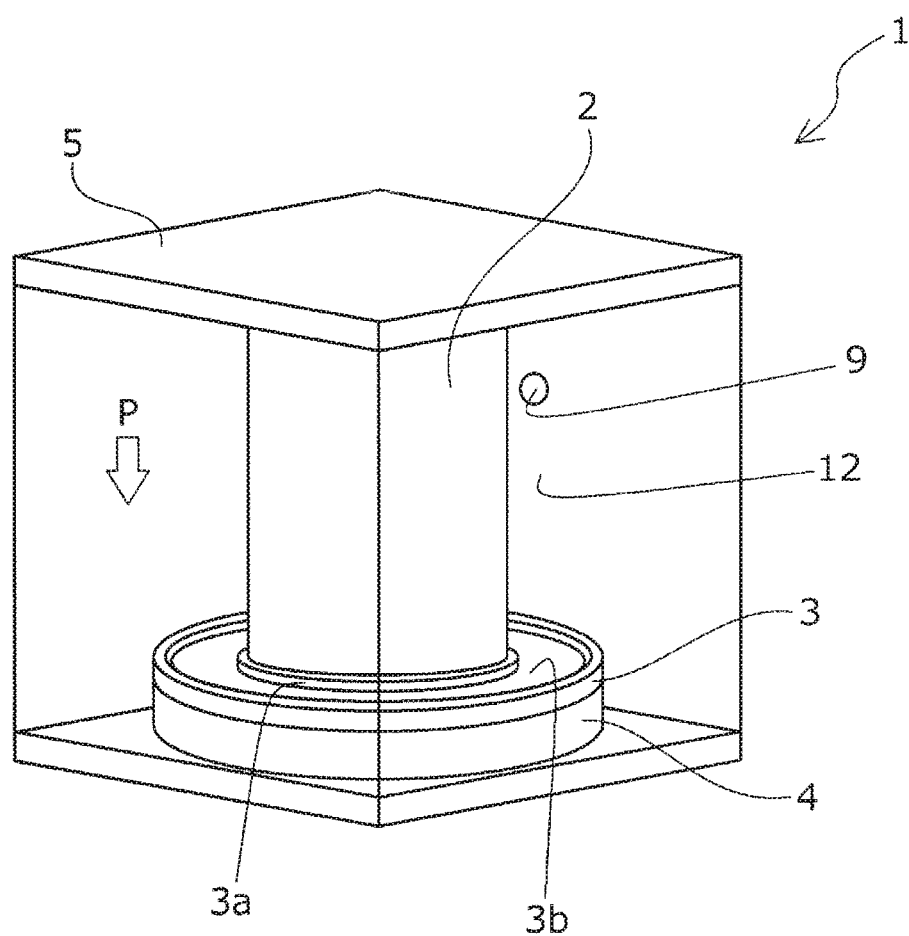
Figure 3:
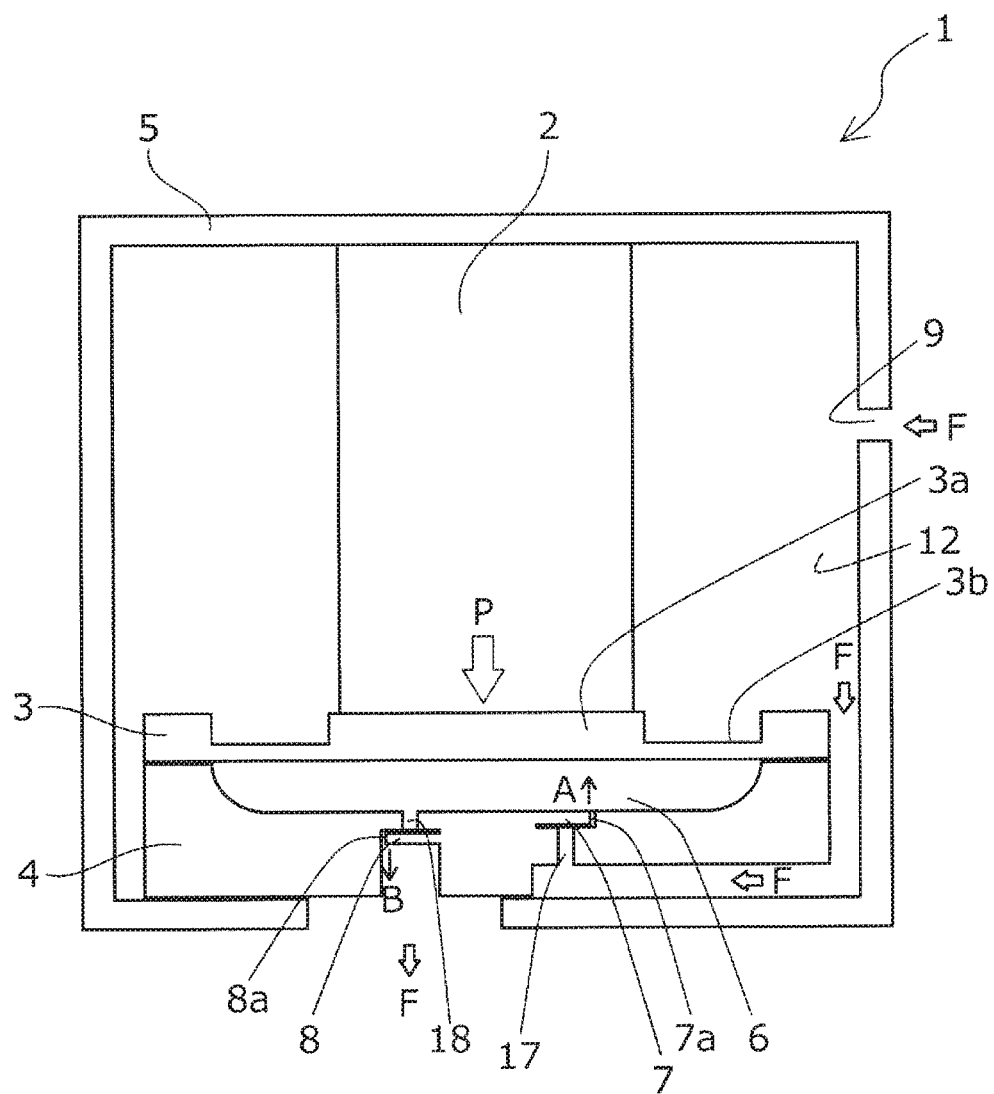
FIG. 3 is a schematic sectional view showing the diaphragm-type compressor according to the first embodiment of the present disclosure.
Figure 4:
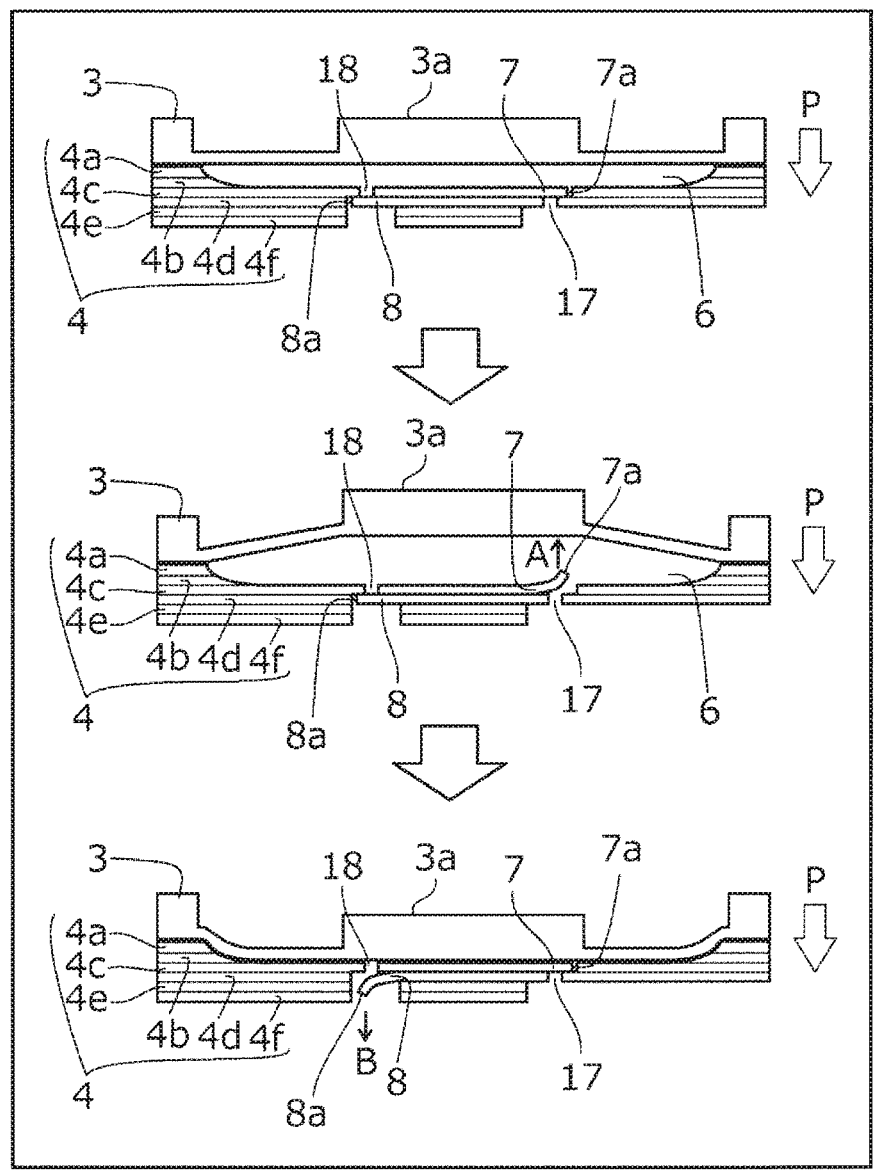
FIG. 4 is a schematic diagram for explaining a state change of the diaphragm-type compressor according to the first embodiment of the present disclosure and is a diagram showing constituent members, a part of which is omitted.

As shown in FIGS. 2 and 3, the diaphragm-type compressor 1 according to this embodiment includes an actuator 2, a diaphragm 3 coupled to the actuator 2, a substrate 4 coupled to the diaphragm 3, and a frame 5 that covers the actuator 2, the diaphragm 3, and the substrate 4. An inflow port 9 of primary coolant is provided in the frame 5. The actuator 2 in this embodiment is a piezoelectric element and is coupled to a not-shown amplifier coupled to a not-shown signal generator. The actuator 2 is configured to be capable of pressing the diaphragm 3 in a pressing direction P by driving the signal generator and the amplifier. A driving wave motion of the actuator 2 by the signal generator and the amplifier can be, for example, a Sin wave. The actuator 2 tends to rise in temperature by being continuously driven. The pressing direction P corresponds to a direction in which the diaphragm 3 is displaced according to the driving of the actuator 2.

As shown in FIGS. 2 and 3, in the pressing direction P, the diaphragm 3 is configured thicker in a region 3a pressed by the actuator 2 than a region 3b not pressed by the actuator 2. "The region 3a pressed by the actuator 2 is thicker in the pressing direction P than the region 3b not pressed by the actuator 2" means that at least a part of a position pressed by the actuator 2 only has to be thicker in the pressing direction P than at least a part of a position not pressed by the actuator 2.

As shown in FIG. 3, in the substrate 4, a hollow is formed on a side coupled to the diaphragm 3. The diaphragm 3 and the substrate 4 are joined to form the hollow as a compression chamber 6. In other words, the substrate 4 includes a thick plate section and a thin plate section. The diaphragm 3 is joined to the thick plate section and the thin plate section is separated from the diaphragm 3 to form the hollow. The compression chamber 6 is a region surrounded by the diaphragm 3, the thick plate section, and the thin plate section.

As shown in FIG. 3, in a position overlapping the actuator 2 in the pressing direction P in the substrate 4, a suction port 17 for enabling the primary coolant, which is fluid, to flow into the compression chamber 6 is provided. A suction valve 7 is provided in the suction port 17. The suction valve 7 is capable of changing a position of an outer side portion 7a in the pressing direction P between when the primary coolant is allowed to flow into the compression chamber 6 and when the primary coolant is not allowed to flow into the compression chamber 6. Specifically the suction valve 7 changes from a top state in FIG. 4 corresponding to a state of FIG. 3 to a second state from the top in FIG. 4 when the primary coolant is allowed to flow into the compression chamber 6.

The diaphragm 3 is pushed up in the opposite direction of the pressing direction P, whereby the inside of the compression chamber 6 changes to a negative pressure. The outer side portion 7a of the suction valve 7 changes the position of the outer side portion 7a in the direction A to open the suction port 17, whereby the primary coolant flows into the compression chamber 6. In this way, only when the primary coolant is allowed to flow into the compression chamber 6, the outer side portion 7a of the suction valve 7 changes the position in the pressing direction P to allow the primary coolant to flow in only the direction F and prevent the primary coolant from flowing back. As shown in FIG. 4, the substrate 4 is provided by stacking and joining a plurality of tabular materials 4a, 4b, 4c, 4d, 4e, and 4f along the pressing direction P. The suction valve 7 is configured integrally with the tabular material 4c among the plurality of tabular materials 4a, 4b, 4c, 4d, 4e, and 4f. The substrate 4 in this embodiment is formed in structure of six layers in total of the tabular materials 4a, 4b, 4c, 4d, 4e, and 4f. However, the substrate 4 is not limited to such a configuration and may be formed by five or less layers or may be formed by seven or more layers.

As shown in FIG. 3, in a position overlapping the actuator 2 in the pressing direction P in the substrate 4, a discharge port 18 for enabling the primary coolant to flow out from the compression chamber 6 is provided. A discharge valve 8 is provided in the discharge port 18. The discharge valve 8 is capable of changing a position of an outer side portion 8a in the pressing direction P between when the primary coolant is allowed to flow out from the compression chamber 6 and when the primary coolant is not allowed to flow out from the compression chamber 6. Specifically, when the primary coolant is allowed to flow out from the compression chamber 6, the discharge valve 8 changes from a second state from the top in FIG. 4 to a bottom state in FIG. 4. The diaphragm 3 is pushed down in the pressing direction P, whereby the inside of the compression chamber 6 changes to a positive pressure. The outer side portion 8a of the discharge valve 8 changes the position of the outer side portion 8a in a direction B to open the discharge portion 18, whereby the primary coolant flows out from the compression chamber 6. In this way, only when the primary coolant is allowed to flow out from the compression chamber 6, the outer side portion 8a of the discharge valve 8 changes the position in the pressing direction P to allow the primary coolant to flow only in the direction F and prevent the primary coolant from blowing back. The discharge valve is configured integrally with the tabular material 4d among the plurality of tabular materials 4a, 4b, 4c, 4d, 4e, and 4f.

As explained above, the inflow port 9 of the primary coolant is provided in the frame 5. The primary coolant flowing into the inside of the frame 5 from the inflow port 9 is capable of coming into contact with the actuator 2 on the inside of the frame 5. However, the diaphragm-type compressor of the present disclosure is not limited to the diaphragm-type compressor 1 having such a configuration. For example, the diaphragm-type compressor of the present disclosure may have a configuration in which, like the discharge port 18, the suction port 17 is directly coupled to the outside of the frame 5 or a configuration in which the primary coolant directly flows into the compression chamber 6 from the outside of the frame 5 via only the suction port 17.

A specific configuration of the suction valve 7 is explained with reference to FIGS. 5 and 6. In the diaphragm-type compressor 1 according to this embodiment, the discharge valve 8 has the same configuration as the configuration of the suction valve 7 except that the disposition of the discharge valve 8 in the direction along the pressing direction P is opposite. However, the diaphragm-type compressor 1 is not limited to such a configuration.

Figure 5:
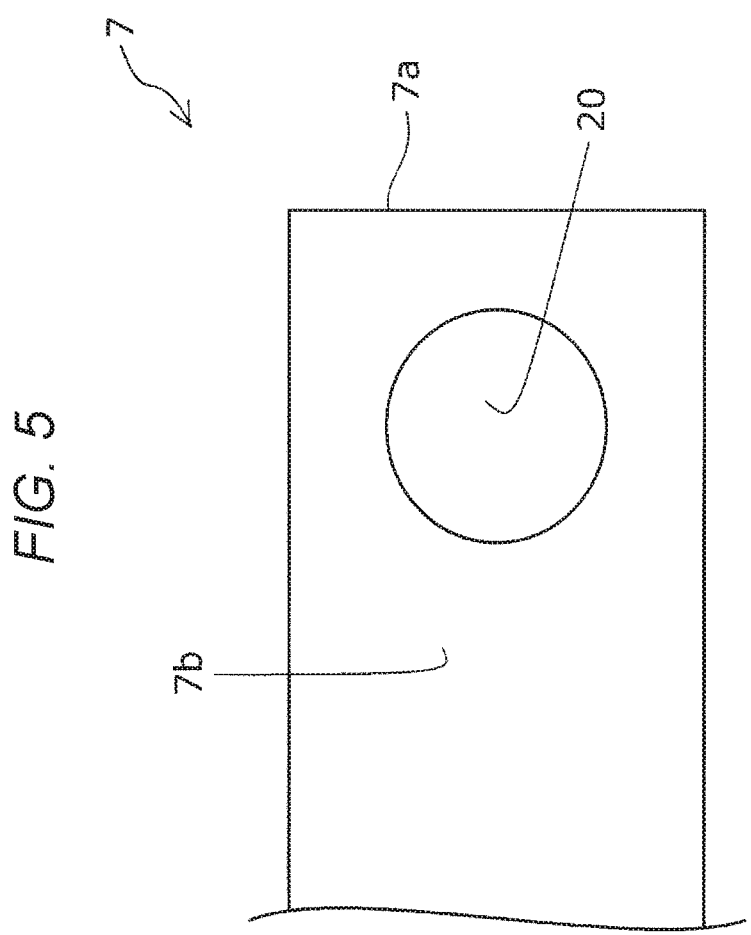
FIG. 5 is a schematic bottom view showing a first valve of the diaphragm-type compressor according to the first embodiment of the present disclosure.
Figure 6:
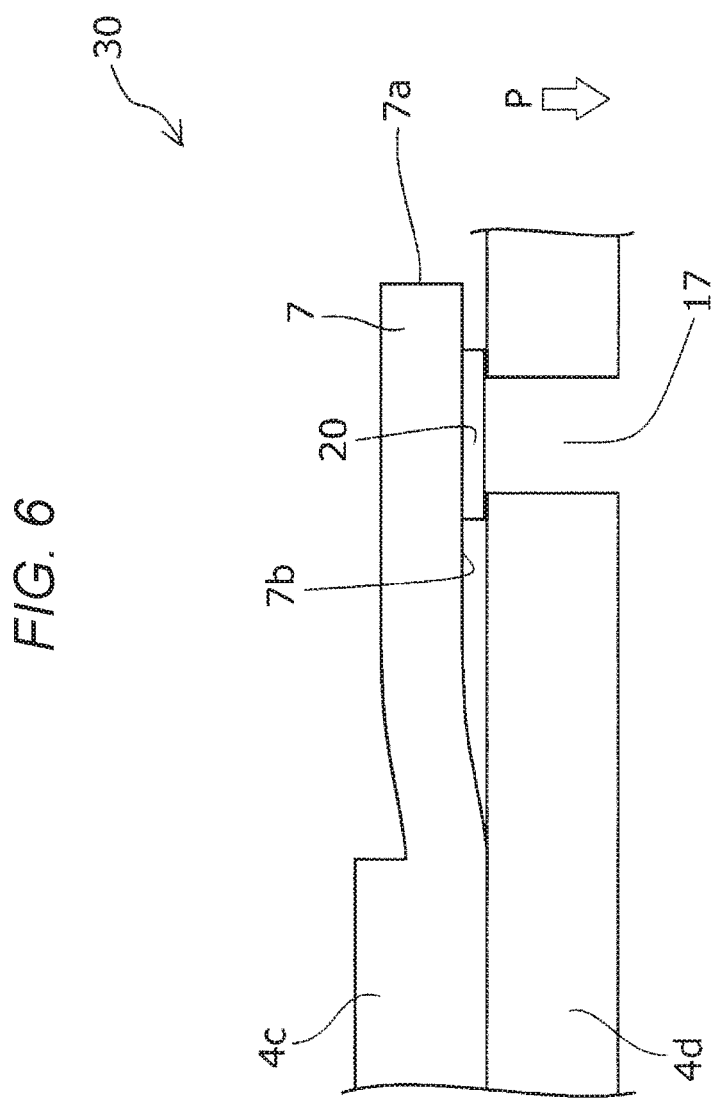
FIG. 6 is a schematic diagram of a structure configuring the diaphragm-type compressor according to the first embodiment of the present disclosure and is a schematic front view showing the disposition of the first valve with respect to a second substrate.

As shown in FIGS. 5 and 6, in the suction valve 7 in this embodiment, in a position opposed to the suction port 17, a sticking suppressing section 20 is provided in a region 7b not joined to the tabular material 4d to prevent the suction valve 7 from easily sticking to the tabular material 4d in which the suction port 17 is provided. Examples of the sticking suppressing section 20 include films of $SiO_2$ and $TiO_2$. However, the material, the shape, the size, and the like of the sticking suppressing section are not particularly limited if the suction valve 7 provided with the sticking suppressing section 20 less easily sticks to the tabular material 4d than the suction valve 7 not provided with the sticking suppressing section 20. For example, the sticking suppressing section 20 may be formed of a constituent material of the suction valve 7 if a contact area of the suction valve 7 with the tabular material 4d decreases and the suction valve 7 less easily sticks to the tabular material 4d because the sticking suppressing section 20 is provided as shown in FIG. 6. Verification concerning whether the suction valve 7 less easily sticks to the tabular material 4d can be performed by, for example, comparing sticking forces of the suction valve 7 and the tabular material 4d between a state in which the sticking suppressing section 20 is provided in the suction valve 7 and a state in which the sticking suppressing section 20 is not provided in the suction valve 7 or a state in which the sticking suppressing section 20 is detached from the suction valve 7.

To summarize about the structure 30 shown in FIG. 6, the structure 30 according to this embodiment includes the tabular material 4c functioning as a first substrate including the suction valve 7 functioning as a first valve and the tabular material 4d functioning as a second substrate joined to the tabular material 4c. As shown in FIG. 6, the suction valve 7 includes the region 7b opposed to the tabular material 4d and not joined to the tabular material 4d. The sticking suppressing section 20 for suppressing sticking to the tabular material 4d is provided in the region 7b. The suction valve 7 provided with the sticking suppressing section 20 less easily sticks to the tabular material 4d than the suction valve 7 not provided with the sticking suppressing section 20. Therefore, the structure 30 according to this embodiment is configured to be able to suppress sticking of the suction valve 7 functioning as the first valve to the tabular material 4d functioning as the second substrate. In the structure 30 according to this embodiment, the sticking suppressing section 20 is provided in the suction valve 7 but may be provided in the tabular material 4d. Examples of a configuration in which the sticking suppressing section 20 is provided in the tabular material 4d include a configuration in which the sticking suppressing section 20 is provided around the suction port 17. However, the configuration is not particularly limited. Further, the sticking suppressing section 20 may be provided in both of the suction valve 7 and the tabular material 4d.

As explained above, the discharge valve 8 in this embodiment has the same configuration as the configuration of the suction valve 7. As shown in FIG. 4, the structure according to this embodiment includes the tabular material 4d including the discharge valve 8 and the tabular material 4c joined to the tabular material 4d. The discharge valve 8 includes the region opposed to the tabular material 4c and not joined to the tabular material 4c. Therefore, the discharge valve 8 can be considered the first valve, the tabular material 4d can be considered the first substrate, and the tabular material 4c can be considered the second substrate. Therefore, the structure 30 according to this embodiment can be expressed as being configured to be able to suppress sticking of the discharge valve 8 functioning as the first valve to the tabular material 4c functioning as the second substrate.

As explained above, the constituent material and the like of the sticking suppressing section 20 are not particularly limited. However, the material of the sticking suppressing section 20 is desirably a material different from the material of the suction valve 7. This is because, if the sticking suppressing section 20 is made of the material different from the material of the suction valve 7, it is possible to more easily and effectively prevent the suction valve 7 from easily sticking to the tabular material 4d than a configuration for machining the suction valve 7 to prevent the suction valve 7 from easily sticking to the tabular material 4d.

This embodiment is explained from the viewpoint of the diaphragm-type compressor 1. In the diaphragm-type compressor 1 according to this embodiment, the substrate 4, which is the structure 30 explained above, the actuator 2, and the diaphragm 3 provided between the substrate 4 and the actuator 2 are laminated. In other words, the diaphragm-type compressor 1 according to this embodiment includes the diaphragm 3, the actuator 2 capable of pressing the diaphragm 3, and the substrate 4, which is the structure 30 explained above that is provided on the opposite side of the actuator 2 with respect to the diaphragm 3 and in which the compression chamber 6 is provided together with the actuator 2. Therefore, by using the diaphragm-type compressor 1 according to this embodiment, it is possible to compress the primary coolant with the diaphragm-type compressor 1 in which the sticking of the suction valve 7 to the tabular material 4d is suppressed.

The structure 30 according to this embodiment including the tabular material 4c including the suction valve 7 and the tabular material 4d joined to the tabular material 4c can be manufactured by executing a joining step of joining the tabular material 4c and the tabular material 4d such that the suction valve 7 includes the region 7b opposed to the tabular material 4d and not joined to the tabular material 4d and a sticking-suppression-section forming step of providing, in the region 7b, the sticking suppressing section 20 for suppressing sticking to the tabular material 4d such that the suction valve 7 provided with the sticking suppressing section 20 less easily sticks to the tabular material 4d than the suction valve 7 not provided with the sticking suppressing section 20. By manufacturing the structure 30 in this way, it is possible to suppress sticking of the suction valve 7 to the tabular material 4d. In the sticking-suppressing-section forming step, the sticking suppressing section 20 only has to be provided in at least one of the suction valve 7 and the tabular material 4d.

Figure 7:
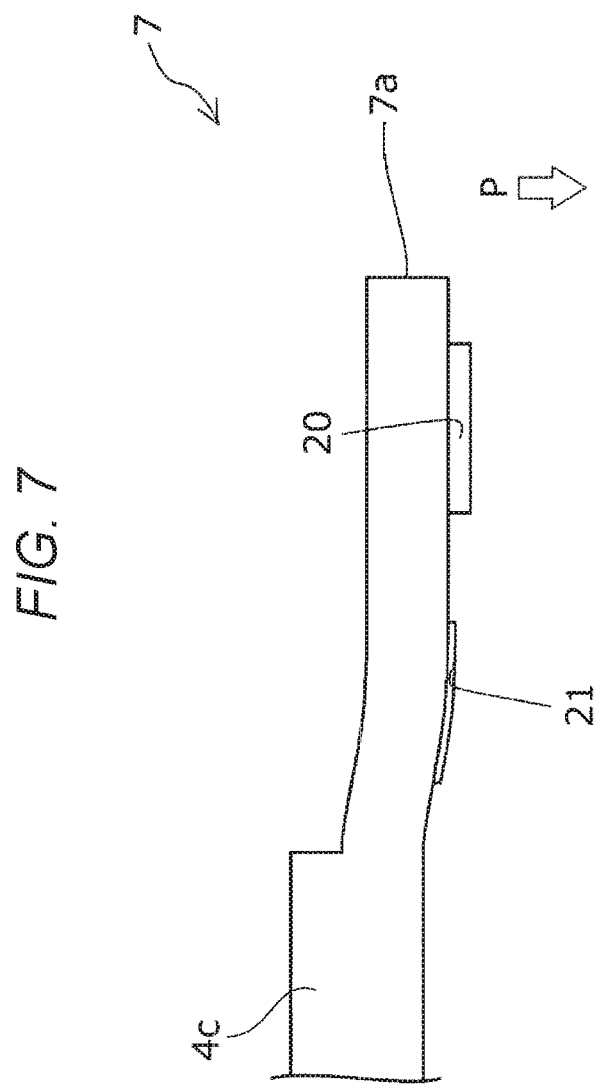
FIG. 7 is a schematic front view showing a first valve of a diaphragm-type compressor according to a second embodiment of the present disclosure.
Figure 8:
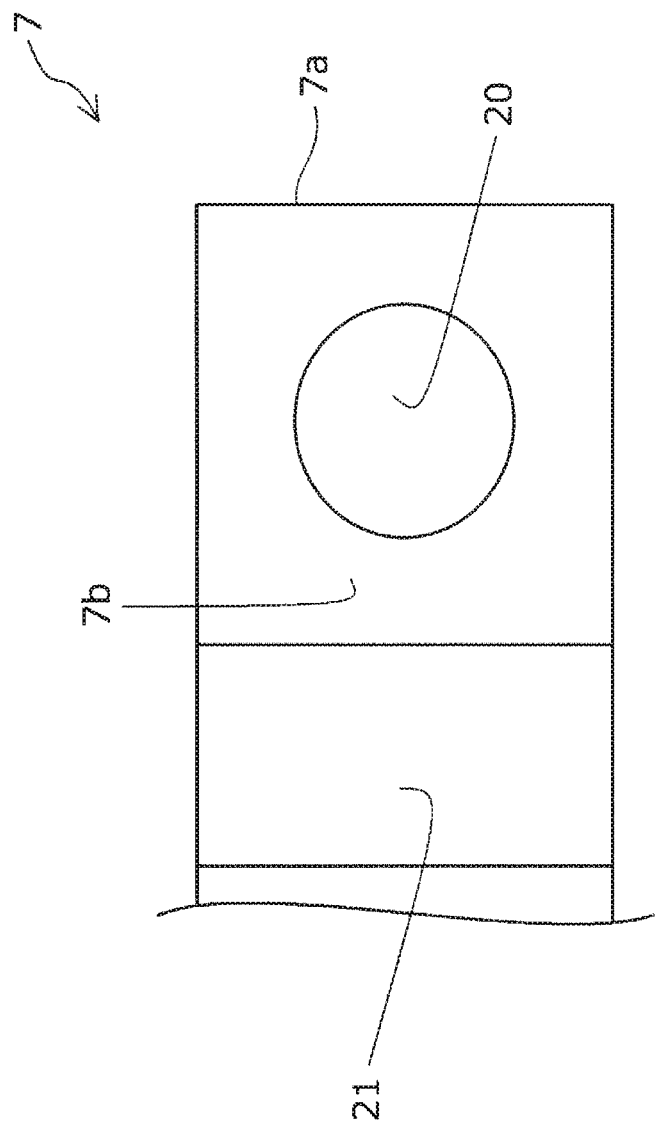
FIG. 8 is a schematic bottom view showing the first valve of the diaphragm-type compressor according to the second embodiment of the present disclosure.
Figure 9:
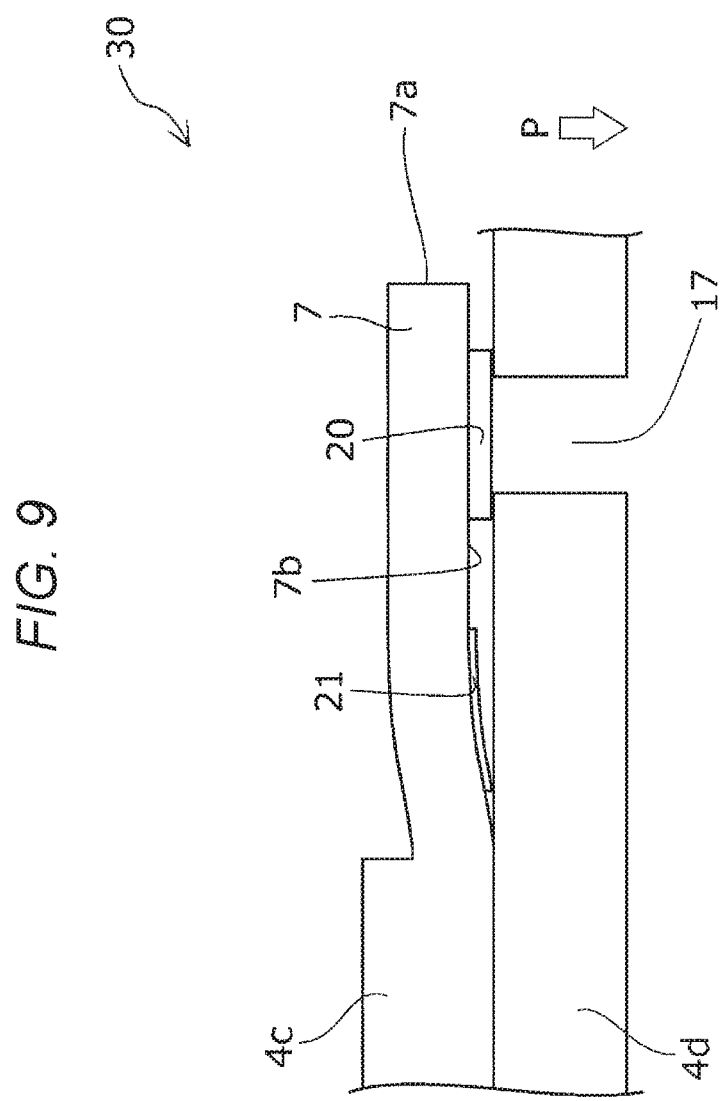
FIG. 9 is a schematic diagram of a structure configuring the diaphragm-type compressor according to the second embodiment of the present disclosure and is a schematic front view showing the disposition of the first valve with respect to a second substrate.

Second Embodiment (FIGS. 7 to 9)

The diaphragm-type compressor 1 according to a second embodiment of the present disclosure is explained with reference to FIGS. 7 to 9. FIG. 8 is a diagram corresponding to FIG. 5 in the diaphragm-type compressor 1 according to the first embodiment. FIG. 9 is a diagram corresponding to FIG. 6 in the diaphragm-type compressor 1 according to the first embodiment. Constituent members common to the first embodiment are denoted by the same reference numerals and signs. Detailed explanation of the constituent members is omitted. The diaphragm-type compressor 1 according to this embodiment has the same configuration as the configuration of the diaphragm-type compressor 1 according to the first embodiment except the suction valve 7 and the discharge valve 8 having the same configuration as the configuration of the suction valve 7.

As shown in FIGS. 7 to 9, a force developing section 21 is provided in the suction valve 7 in the diaphragm-type compressor 1 according to this embodiment. The discharge valve 8 in the diaphragm-type compressor 1 according to this embodiment has the same configuration as the configuration of the suction valve 7 as explained above. The force developing section 21 is provided in the discharge valve 8. However, as in the diaphragm-type compressor 1 according to the first embodiment, the disposition of the discharge valve 8 in this embodiment in the direction along the pressing direction P is opposite to the disposition of the suction valve 7.

In the suction valve 7 in the diaphragm-type compressor 1 according to this embodiment, in detail, as shown in FIG. 7, the force developing section 21 is provided such that a force is applied toward the pressing direction P side, that is, a side to which the sticking suppressing section 20 is pressed. In other words, as shown in FIG. 9, in the region 7b where the suction valve 7 is opposed to the tabular material 4d, the force developing section 21 in which a force is applied to the suction valve 7 in a direction in which the suction valve 7 is pressed toward the tabular material 4d is provided. Therefore, the structure 30 according to this embodiment is configured to be able to suppress a leak of fluid from a channel in a state in which the suction port 17, which is the channel, is closed by the suction valve 7.

As explained above, the discharge valve 8 in this embodiment is the same configuration as the configuration of the suction valve 7. Therefore, in a region where the discharge valve 8 is opposed to the tabular material 4c, the force developing section 21 in which a force is applied to the discharge valve 8 in a direction in which the discharge valve 8 is pressed toward the tabular material 4c is provided. Therefore, the structure 30 according to this embodiment can be expressed as being configured to be able to suppress a leak of fluid from a channel in a state in which the discharge port 18, which is the channel, is closed by the discharge valve 8.

As shown in FIG. 7, the force developing section 21 in this embodiment is configured by sticking a film-like seal member to the region 7b in a state in which the suction valve 7 is deformed such that a force is applied toward the pressing direction P side. However, the force developing section 21 is not limited to such a configuration. The constituent material, the shape, the size, and the like of the force developing section 21 are not particularly limited.

As shown in FIGS. 7 to 9, the force developing section 21 in this embodiment is configured separately from the sticking suppressing section 20. When the force developing section 21 and the sticking suppressing section are separately configured, it is possible to easily improve performance of each of the sticking suppressing section 20 and the force developing section 21.

However, the force developing section 21 and the sticking suppressing section 20 may be integrally configured. By integrally configuring the force developing section 21 and the sticking suppressing section 20, it is possible to provide the force developing section 21 even when the suction valve 7 is small and it is difficult to configure the force developing section 21 separately from the sticking suppressing section 20.

Figure 10:
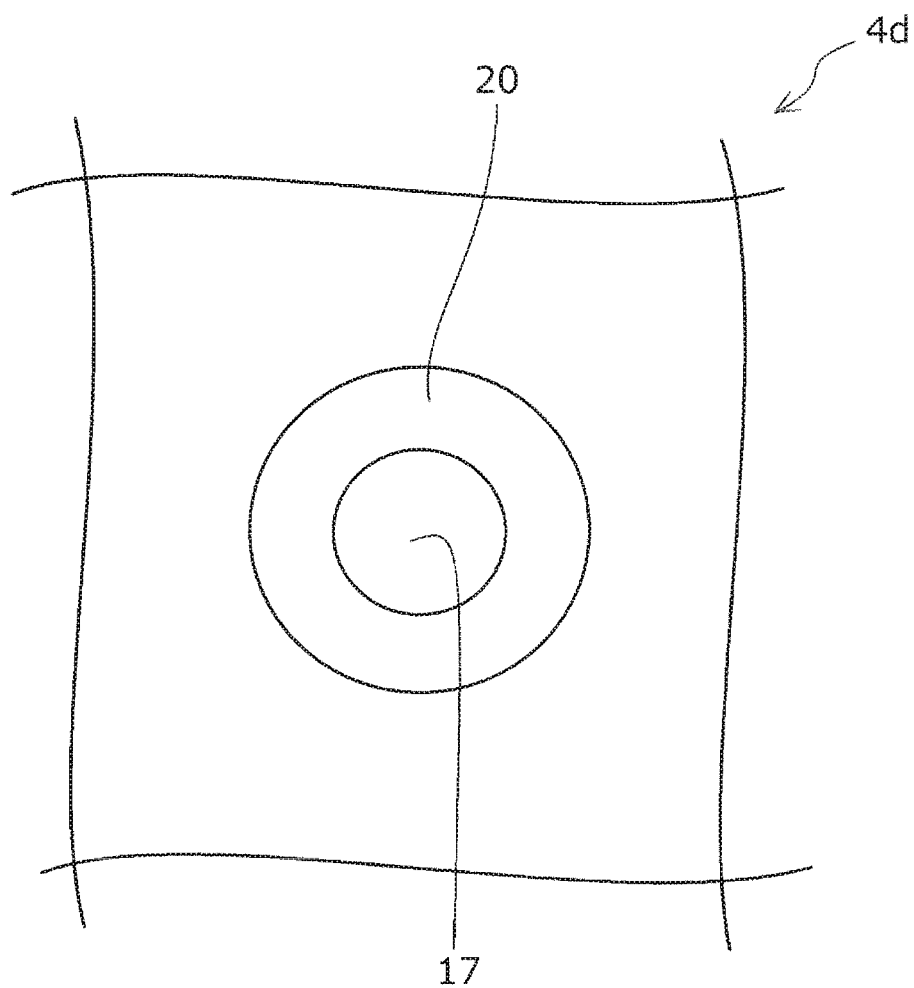
FIG. 10 is a schematic plan view showing a second substrate of a diaphragm-type compressor according to a third embodiment of the present disclosure.
Figure 11:
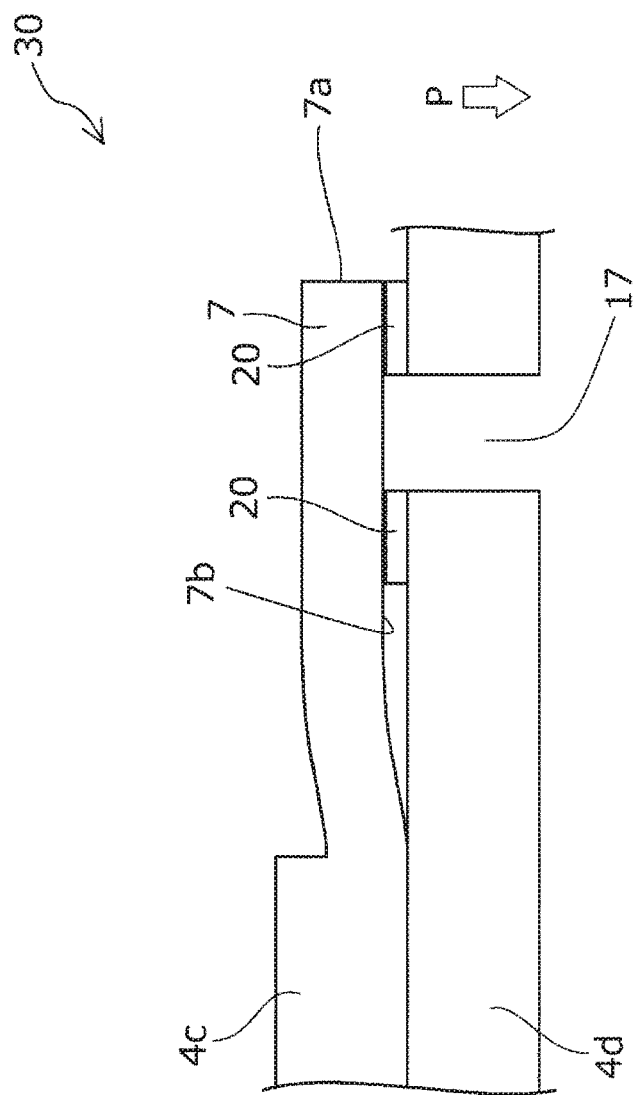
FIG. 11 is a schematic diagram of a structure configuring the diaphragm-type compressor according to the third embodiment of the present disclosure and is a schematic front view showing the disposition of a first valve with respect to the second substrate in a state in which the first valve is closed.
Figure 12:
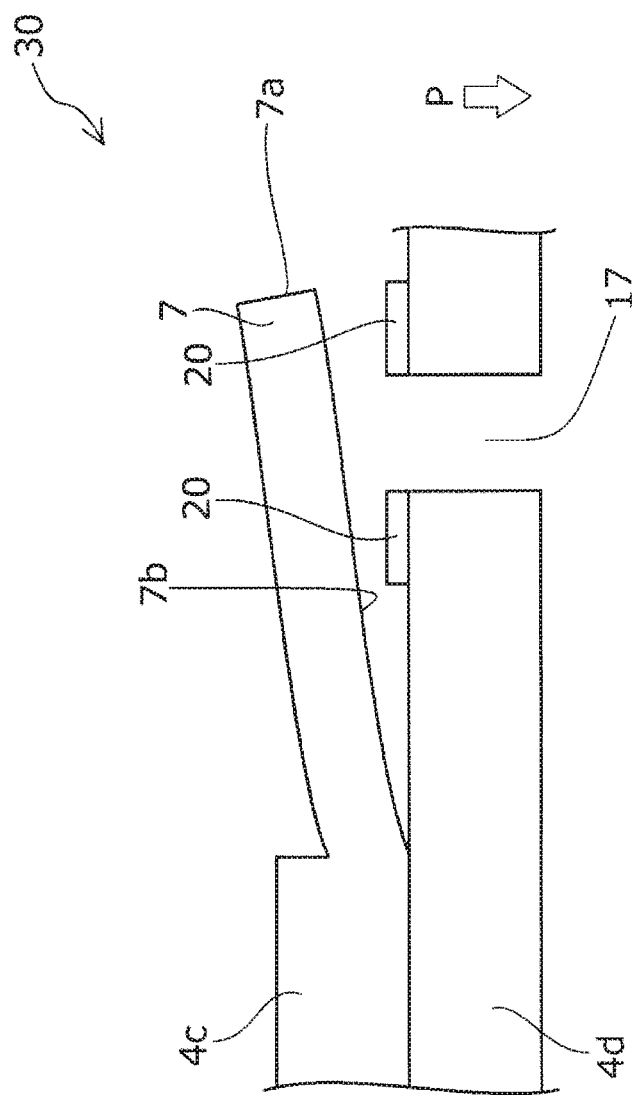
FIG. 12 is a schematic diagram of the structure configuring the diaphragm-type compressor according to the third embodiment of the present disclosure and is a schematic front view showing the disposition of the first valve with respect to the second substrate in a state in which the first valve is open.

Third Embodiment (FIGS. 10 to 12)

The diaphragm-type compressor 1 according to a third embodiment of the present disclosure is explained with reference to FIGS. 10 to 12. FIG. 11 is a diagram corresponding to FIG. 6 in the diaphragm-type compressor 1 according to the first embodiment. Constituent members common to the first embodiment are denoted by the same reference numerals and signs. Detailed explanation of the constituent members is omitted. The diaphragm-type compressor 1 according to this embodiment has the same configuration as the configuration of the diaphragm-type compressor 1 according to the first embodiment except that the sticking suppressing section 20 is provided in the tabular material 4d rather than the suction valve 7.

As shown in FIGS. 10 to 12, in the diaphragm-type compressor 1 according to this embodiment, the sticking suppressing section 20 is provided in the tabular material 4d around the suction port 17. The sticking suppressing section 20 in this embodiment is provided in a cylindrical shape around the circular suction port 17. However, the sticking suppressing section 20 is not limited to such a configuration.

The present disclosure is not limited to the embodiments. Various modifications are possible within the scope of the present disclosure described in the appended claims. It goes without saying that the modifications are also included in the scope of the present disclosure. For example, the shape of the actuator 2, the shape of the frame 5, and the like are not limited to the configurations of the embodiments. For example, an actuator having a quadrature prism shape may be used instead of the actuator 2 having the columnar shape. A frame, the external shape of which is a columnar shape, may be used instead of the frame 5, the external shape of which is the quadrature prism shape. The structure 30 may be used in an apparatus other than the diaphragm-type compressor 1. Further, for example, the actuator is not limited to the piezoelectric element and can be transformed into a motor, a solenoid, a voice coil motor, and the like, which are included in the scope of the present disclosure.

What is claimed is:

1. A structure comprising:
a first substrate including a first valve; and
a second substrate joined to the first substrate and including a suction port or a discharge port, wherein
the structure includes a region where the first valve and the second substrate are not joined, and
a sticking suppressing section is provided in at least one of the first valve and the second substrate in the region,
wherein a force developing section in which a force is applied to the first valve in a direction in which the first valve is pressed toward the second substrate is provided in the region.

2. The structure according to claim 1, wherein the force developing section is configured integrally with the sticking suppressing section.

3. The structure according to claim 1, wherein the force developing section is configured separately from the sticking suppressing section.

4. A diaphragm-type compressor comprising:
a substrate, which is the structure according to claim 1;
an actuator; and
a diaphragm provided between the substrate and the actuator,
the substrate, the actuator, and the diaphragm being laminated, wherein
in a direction of the lamination, the substrate includes a thick plate section and a thin plate section, and
the diaphragm is joined to the thick plate section and separated from the thin plate section.

5. A cooler comprising:
the diaphragm-type compressor according to claim 4;

a heat exchanging section configured to radiate heat of a coolant that rises in temperature by being compressed by the diaphragm-type compressor; and a coolant expanding section configured to expand the coolant.

6. A projector comprising the cooler according to claim 5, wherein a light source or an optical element is coupled to the cooler via a secondary coolant pipe.

* * * * *